United States Patent [19]
Reele

[11] Patent Number: 5,742,046
[45] Date of Patent: Apr. 21, 1998

[54] AMPLIFIER CIRCUIT FOR PROVIDING OUTPUTS AS A FUNCTION OF SENSED LIGHT

[75] Inventor: Samuel Reele, Rochester, N.Y.

[73] Assignee: Eastman Kodak Company, Rochester, N.Y.

[21] Appl. No.: 731,807

[22] Filed: Oct. 18, 1996

[51] Int. Cl.$^6$ .............................. G01J 1/20; G11B 7/00
[52] U.S. Cl. ........................... 250/214 A; 250/201.5; 369/112; 369/44.41
[58] Field of Search ...................... 250/201.5, 214 A; 369/112, 116, 44.41

[56] References Cited

U.S. PATENT DOCUMENTS

| | | | |
|---|---|---|---|
| 4,656,618 | 4/1987 | Kaku et al. | 369/112 |
| 4,949,311 | 8/1990 | Barnard | 369/54 |
| 5,113,386 | 5/1992 | Whitehead et al. | 369/44.41 |
| 5,278,401 | 1/1994 | Takishima | 250/201.5 |
| 5,396,478 | 3/1995 | Krantz | 369/44.41 |
| 5,436,880 | 7/1995 | Eastman et al. | 369/116 |
| 5,495,466 | 2/1996 | Dohmeier et al. | 369/116 |
| 5,565,674 | 10/1996 | Reele | 250/239 |

*Primary Examiner*—Stephone B. Allen
*Attorney, Agent, or Firm*—Edward Dugas

[57] ABSTRACT

An improved amplifier architecture for providing an output as a function of light sensed by a photodetector element where the amplifier has an input for receiving the current output from the photodetector element and an output for providing an output that is a clamped function of light sensed by the photodetector element. A feedback circuit is connected between the input and the output of the amplifier. A signal clamp connected to the output of the amplifier that clamps the output of the amplifier to a predetermined value. A summing node having first, second, and third inputs, and an output at which a signal that is a function of sensed light is provided. A first current path connected between the input to the amplifier and to a first input of the summing node for passing excess current from the input of the amplifier to the summing node when the output of the amplifier is at its clamped output. Also provided is a second current path connected between the output of the amplifier and a second input to the summing node along with a reference voltage source connected to the third input to the summing node for limiting the current flowing through the second current path.

5 Claims, 5 Drawing Sheets

AMPLIFIER CIRCUIT FOR PROVIDING OUTPUTS AS A FUNCTION OF SENSED LIGHT

FIELD OF THE INVENTION

The invention relates generally to the field of optical reader/writers, and in particular to a circuit for optimizing the quality of writing onto an optical storage media.

BACKGROUND OF THE INVENTION

In the field of data storage, laser writers are used to change the state of a storage media such as a CD disk. The same writer can be used to read the states of the storage media. With improvements in speed being continually demanded both for the writing of the disk and later in the reading of the disk, it has been deemed advantageous to perform a Read operation as quickly as possible after the Write operation to confirm the accuracy of the write operation. At least one patent, U.S. Pat. No. 4,949,311, entitled "Single Laser Direct Read After Write System (DRAW)" by Barnard, discloses the state of the art for a direct read after write operation. Another patent is U.S. Pat. No. 5,495,466, entitled "Write Verification In an Optical Recording System by Sensing Mark Formation While Writing" by Dohmeier, et al. discloses a read operation that occurs during a write operation. In this patent, not only is the accuracy of the Write operation confirmed, laser power or write strategy is modified during writing in order to perfect the quality of the written mark and/or to burn-through contamination on the storage disk.

FIG. 1 illustrates a Prior Art circuit 20 for providing signals $V_{FA}$, $V_{FB}$, $V_{TA}$, and $V_{TB}$ that are used to derive error signals that are used in focusing and tracking of the laser read/write beam onto the storage media. Additionally, a signal $V_{DRDW}$ is generated and used to read and/or verify the quality of the writing during the Write portion of an optical Reader/Writer's operation. Inputs to this circuit are derived from multiple photodetector elements that are physically arranged to sense reflected light from the surface of the storage media and provide a light dependent output current. Each of the photodetectors is a semiconductor photodiode having its cathode connected in common to the other cathodes and their anodes providing individual inputs to dedicated transimpedence amplifiers 22, 24, 26, and 28. This method is hereafter referred to as "cathode sensing" DRDW (Direct Read During Write) signal sensing.

Limitations of this circuit center around its speed and bandwidth. These limitations are caused primarily by the large shunt capacitance that results from connecting the photodetector elements in common and with the use of a current mirror 27 comes the limitation of the current mirrors bandwidth. The result is a $V_{DRDW}$ signal output from amplifier 29 which settles to a steady state value in as long as 20-30 ns when subjected to a step input of reflected light or one in which the slope and/or overshoot is inconsistent for various magnitudes of sensed light. All of which has been deemed undesirable for DRDW at 8× speeds when applying Dohmeier, et al. concepts.

For systems which use sampling of the focus and tracking error signals, it is highly desirable to have the outputs of the preamplifiers not saturate when receiving Write level signals from the photodetectors. Typically Write current levels are 10×-15× Read current levels and may be as high as 30× Read current levels. Since one usually uses the entire linear range for a Read operation to optimize the signal-to-noise ratio, preamplifiers would typically saturate or rail during a Write operation. Saturated preamplifiers, however, do not recover and settle to within 1% of final value in sufficient time (typically <27 ns for 8× speeds) when subjected to transitions between Write and Read operations. The 1% accuracy of final value is required for accurate focus and tracking information. As a result, it is desirable to have the outputs of the preamplifiers clamp to the maximum Read level output voltage during the Write operation. The way in which this is typically accomplished when transimpedence amplifiers are used as the preamplifiers is to clamp the output voltage of the transimpedence amplifiers to a fixed level of the output voltage which is equivalent to a maximum Read operation. The PNP transistors connected between the (−/=) input of each amplifier and ground establishes the clamping voltage level and acts as a shunt to ground for excess currents.

An improved method is disclosed in U.S. Pat. No. 5,565, 674, entitled, "Optical Detection and Signal Conditioning Package," by Reele, hereafter referred to as "current sensing" DRDW signal sensing. The method of that patent is one in which each of the currents from each photodetector element is sensed and split between focus and tracking amplifiers and the DRDW amplifier at all times. Although improved speed and bandwidth can be achieved, (on the order of 70 Mhz bandwidth and 150 volts/µsec slew). Since not all of the current is available to the focus and tracking channels, further limitations such as non-optimized focus and tracking channels or a limiting of the range of currents over which they operate and/or a loss in focus and tracking channel bandwidths or an increase in channel noise are realized. In addition, the DRDW channel is also limited with respect to slew rate and bandwidth since all of the current is also not available for this channel. The following invention addresses one or more limitations set forth in the prior art method and the above disclosed methods of generating a direct Read signal to be used during writing.

SUMMARY OF THE INVENTION

The present invention is directed to overcoming one or more of the problems set forth above. Briefly summarized, according to one aspect of the present invention there is provided an amplifier circuit for providing outputs as a function of sensed light comprising:

- a photodetector element for providing a current output as a function of sensed light;
- an amplifier having an input for receiving the current output from said photodetector element and for providing at an output an output signal that is a clamped function of sensed light;
- feedback means connected between the input and the output of said amplifier;
- clamping means connected to the output of said amplifier for clamping the output of said amplifier to a predetermined value;
- a summing node having first, second, and third inputs, and an output at which a signal that is a function of sensed light is provided;
- a first current path connected between the input to said amplifier and to a first input to said summing node for passing excess current from the input to said amplifier to the summing node when the output of said amplifier is at its clamped output;
- a second current path connected between the output of said amplifier and a second input to summing node; and
- a reference voltage source connected to a third input to said summing node for limiting the current flowing through the second current path.

These and other aspects, objects, features, and advantages of the present invention will be more clearly understood and appreciated from a review of the following detailed description of the preferred embodiments and appended claims, and by reference to the accompanying drawings.

Advantageous Effect of the Invention

The present invention has the following advantages:

a) Highest DRDW bandwidth and slew rates compared to "cathode sensing" or the disclosed "current sensing DRDW" sensings. We have fabricated and tested photodetector and preamplifier subsystems with 1000 volts/µsec slew rates and bandwidths of 100 Mhz. Simulations have shown that subsystems with a minimum of 500 volts/µsec slew rates and minimum bandwidths of 75 Mhz are achievable. $V_{DRDW}$ signals which settle to a steady state value within 1% in 14 ns when subjected to a step input of reflected light have been observed.

b) Maximum signal-to-noise for FES and TES amplifiers.

c) Higher bandwidth, lower noise FES and TES amplifiers.

d) Lower power dissipation (33%).

Minimal Sum quiescent currents exist during the Read operation and all of the overload current is used rather than passed to ground as unusable ground currents.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
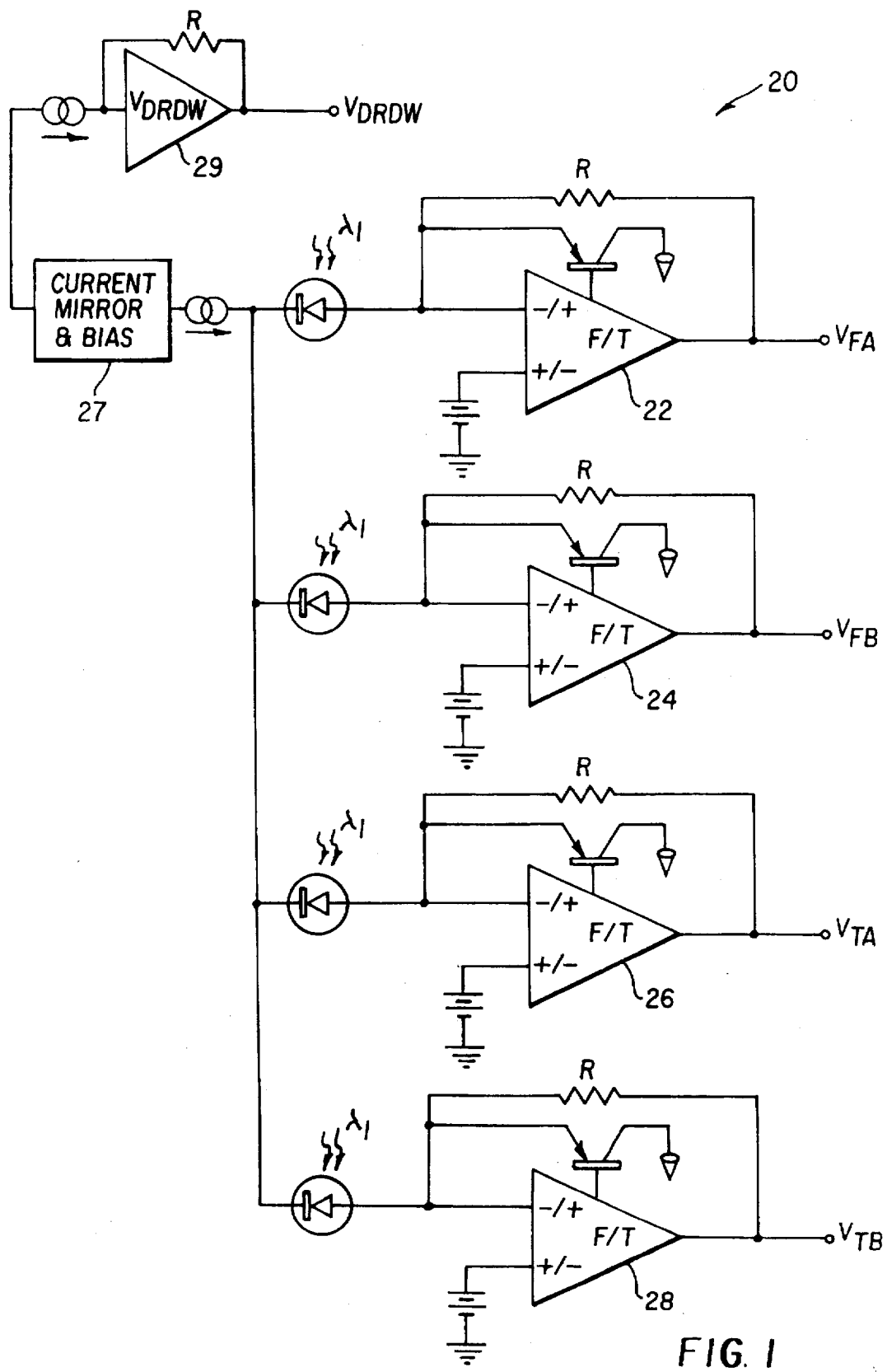
FIG. 1 is a PRIOR ART circuit diagram that generates waveforms for use in Direct Read During Write for optical recording systems.
Figure 2:
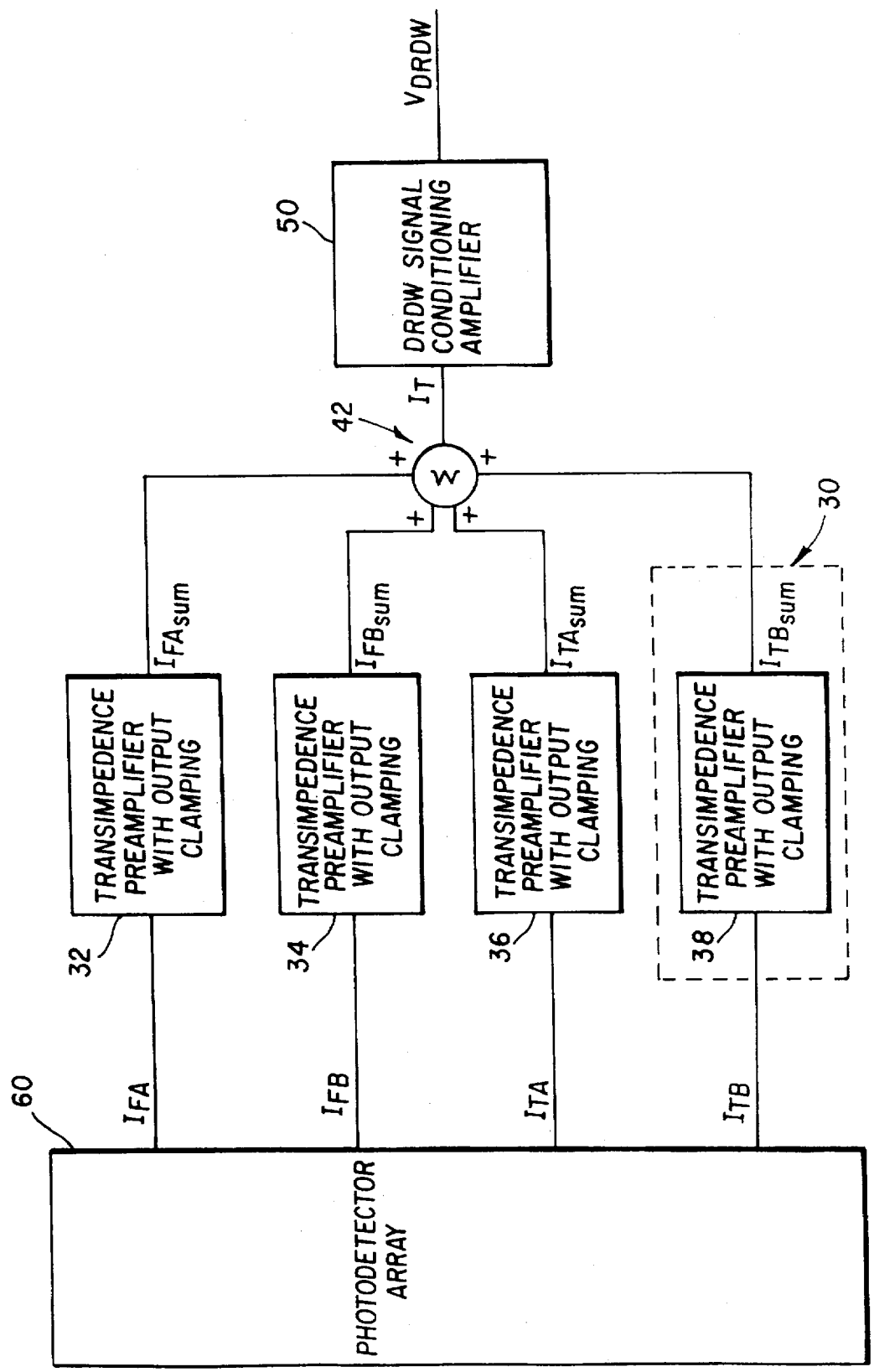
FIG. 2 is a block diagram illustrating a preferred embodiment of the invention.

Referring to FIG. 2, The preferred embodiment circuit 30 is formed with the following building blocks: a photodetector array 60; a Direct Read During Write (DRDW) signal conditioning amplifier 50; and four identical transimpedence preamplifiers with output clamping 32, 34, 36, and 38, each functioning to sense overload currents from focus and tracking pre-amplifiers and for diverting any sensed overload currents to the DRDW amplifier 50 via a summing node 42.

Figure 3:
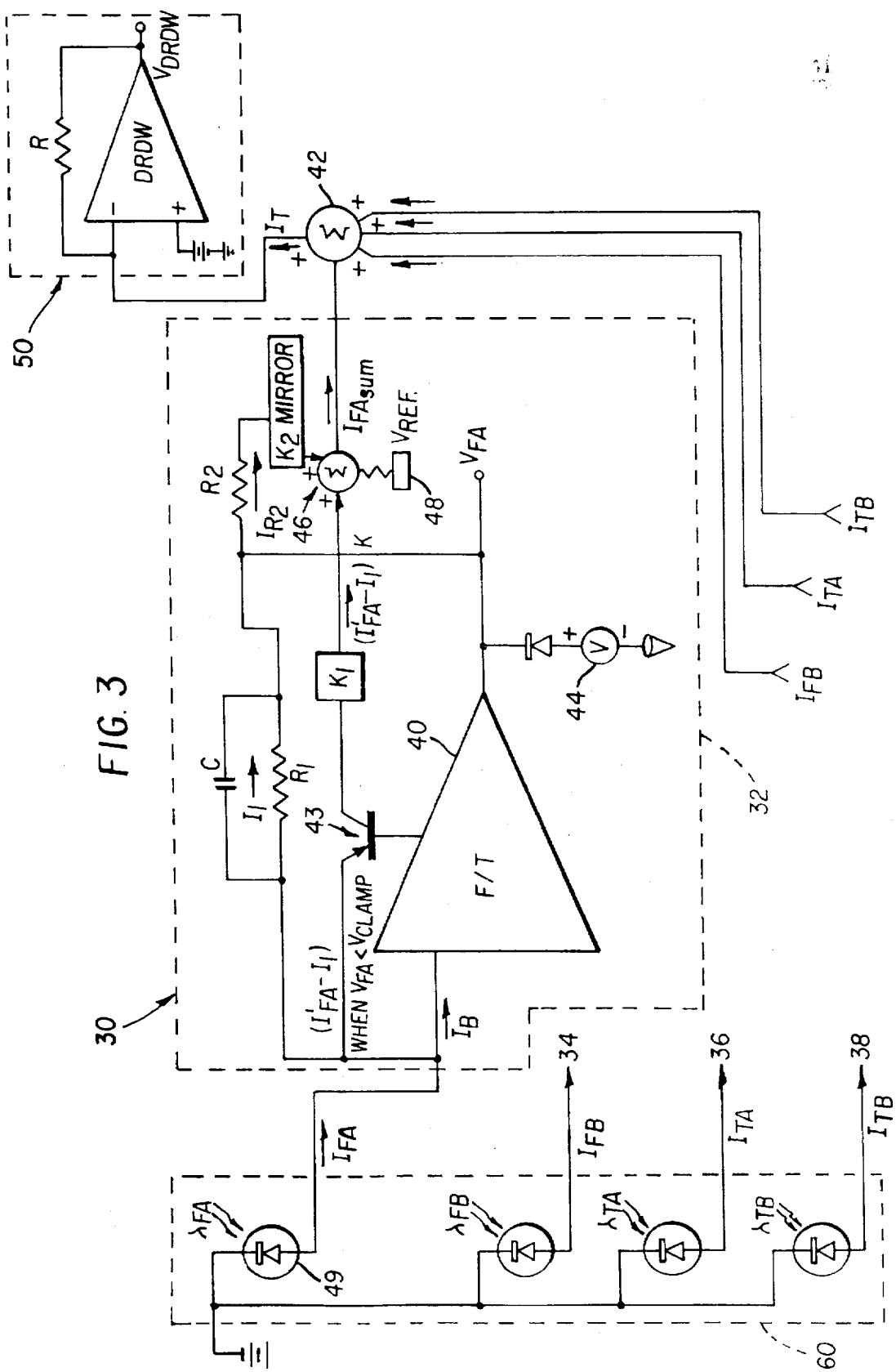
FIG. 3 is a circuit level diagram illustrating the construction of the inventive block of FIG. 2.

Referring now to FIG. 3, only one of the identical circuits 32 is shown in detail for clarity purposes. The circuit is comprised of a low input impedance transimpedence amplifier 40 having its output voltage clamped by a voltage clamp 44, a PNP transistor 43 having its output connected to a summing node 42 via a current gain stage $K_1$ and a summing node 46. Additionally, a feedback resistor $R_1$ provides the D.C. trans-resistance. A feedback capacitor C, connected in parallel to $R_1$, is used to tailor the A.C. response and gain peaking. A resistor $R_2$ provides a current path between the output of the amplifier 40 and an input to the summing node 46 via a mirror gain stage $K_2$. The current through $R_2$ is a function of the detected light from a focus photodetector element 49, represented by the signal $I_{FA}$, when the amplifier's 40 output voltage is not clamped (when the optical recording system is in the READ mode).

The following equations are useful in understanding the operation of the present circuit:

$$V_{FA} = V_{FA_{DARK}} - \{I_{FA}(R_T)\}$$

where $R_T$=preamplifier's equivalent transimpedence $$\Delta I_{FA_{sum}} = K_2[\{\Delta I_{FA}(R_T)\}/R_2] + K_1(\Delta_{FA^-I_1}) \text{ when } V_{FA} \leq V_{CLAMP}$$

$$\Delta I_{FA_{sum}} = K_2[\{\Delta I_{FA}(R_T)\}/R_2] \text{ when } V_{FA} > V_{CLAMP}$$

Figure 4A:
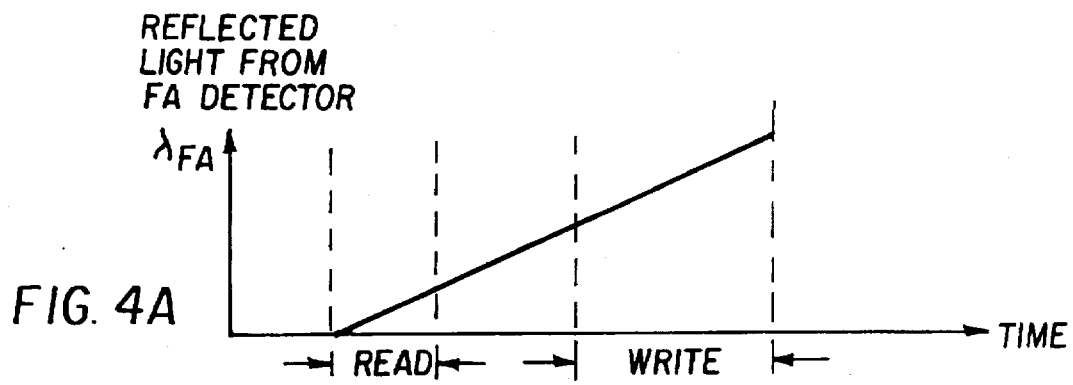
FIGS. 4A–4E illustrate waveforms useful in understanding the operation of the preferred embodiment of the invention.
Figure 4B:
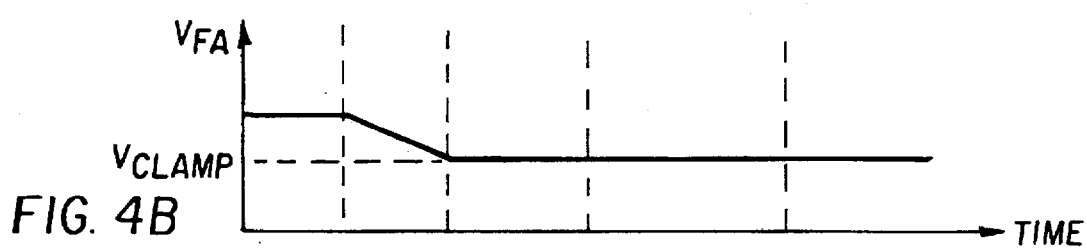
Figure 4C:
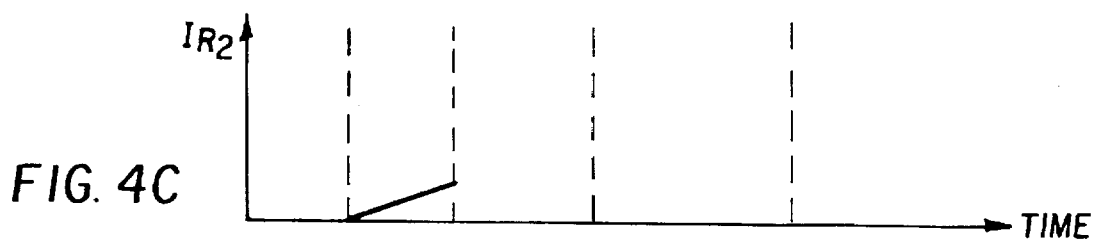
Figure 4D:
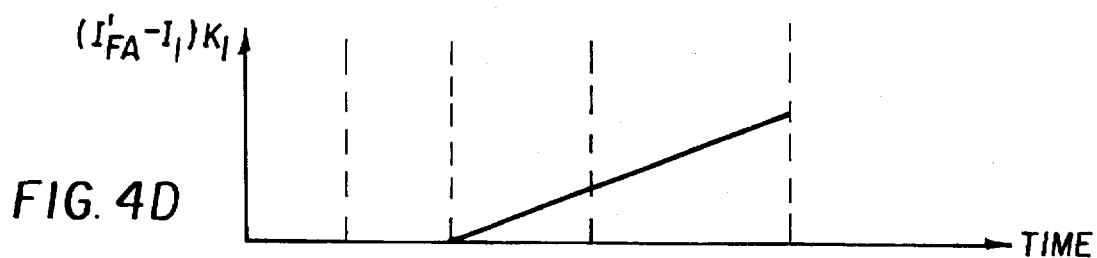
Figure 4E:
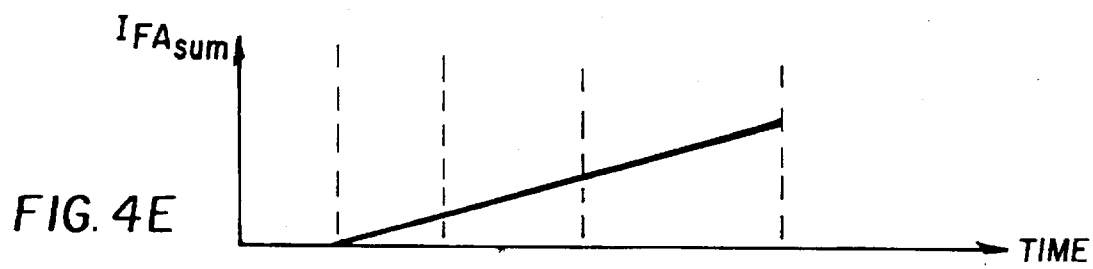

The aforementioned can be more clearly understood by reference to FIGS. 4A, 4B and 4C. FIG. 4A depicts the magnitude of reflected light from the focus photodetector element 49 as incident light is linearly increased in magnitude as a function of time on the surface of the optical recording disk. FIG. 4B depicts the output voltage of amplifier 40 ($V_{FA}$) when the amplifier is subjected to the input as shown in FIG. 4A. FIG. 4C depicts the resultant current through $R_2$ when the amplifier is subjected to the input as shown in FIG. 4A. This Read current is clamped by the voltage reference $V_{ref}$ 48 at the summing node 46 and the $V_{CLAMP}$ 44 as depicted in FIG. 3. The PNP transistor 43 is biased "on" when the specified clamp voltage is achieved at which time it sends the excessive (overload) current to the summing node 46 as shown in FIG. 4D. The resultant current out of the summing node 46 is a linear current $I_{FA_{sum}}$ which is a function of the detected light from a focus photodetector element 49 for both the Read and Write operation as shown in FIG. 4E.

Figure 5A:
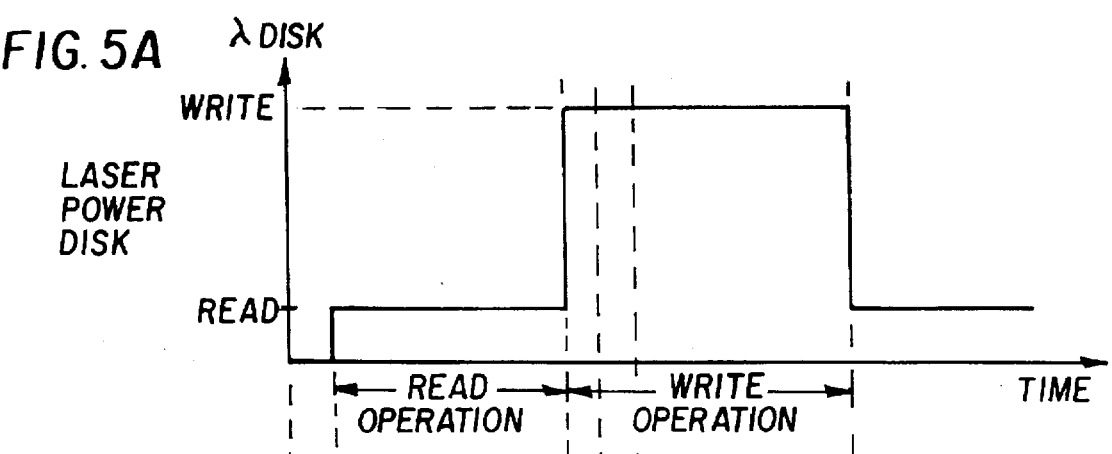
FIGS. 5A and 5B are waveforms illustrating laser power to the disk during Read and Write operations, and the output signal from the preferred circuit embodiment of the invention when subjected to the input conditions of FIG. 5A, respectively.
Figure 5B:
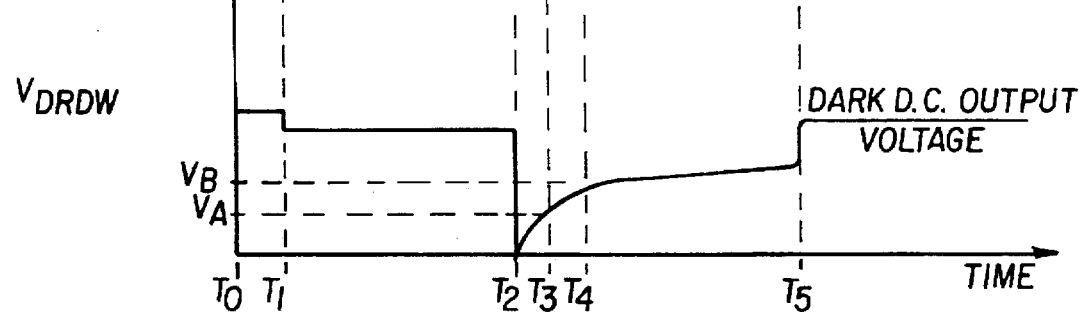

Circuits 34, 36, and 38 of FIG. 2 function in a similar manner with the output of each being summed by the summing node 42. The output of the summing node 42 is the input to the non-clamped DRDW transimpedence amplifier 50. The resultant output of the DRDW amplifier is a voltage which is a linear representation of the total reflected light (all focus and tracking photodetector elements) from an optical disk during a Read and/or Write function. During the Write function this signal, $V_{DRDW}$ is used to modify or control laser power during the Write mode in order to optimize the quality of a written mark. Specifically, this is done through the sampled equation (A–B)/A representing the quality of a mark as it is being formed as per previous DRDW patent, by Dohmeier, et al. The aforementioned will be more clearly understood with reference to FIGS. 5A and 5B. Specifically in FIG. 5A, laser power to the disk is shown as a function of time whereby at time $t_0$ to $t_1$ the writer is neither reading or writing, at time $t_1$ to $t_2$ the writer is in a Read mode, and at times $t_2$ to $t_5$ the writer is in a Write mode of operation. Specifically in FIG. 5B the output signal $V_{DRDW}$ is shown as a function of time when subjected to the input condition as depicted in FIG. 5A. During time $t_0$ to $t_1$, $V_{DRDW}$ is at its dark D.C. output voltage level. During time $t_1$ to $t_2$, $V_{DRDW}$ is at a value which is equivalent to the amplifier's transimpedence multiplied by the read input current. At time $t_2$, $V_{DRDW}$ is at a value which is equivalent to the resultant input current from a highly reflective media during the initial mark formation times the amplifier's transimpedence. At time $t_3$, $V_{DRDW}$ is at a value which is equivalent to the resultant input current from a less reflective media during partial mark formation multiplied by the amplifier's transimpedence. At times $t_4$ to $t_5$, the reflectivity of the media is constant during the completion of the writing process. As a result, $V_{DRDW}$ is at a constant value during this time frame. By sampling signal $V_{DRDW}$ at times $t_2$ and $t_3$ one can derive the equation $(V_A-V_B)/V_A$ whereby this normalized slope defines the mark formation quality while writing and can be used in a write power servo loop to verify and optimize writing quality as per the teaching of Dohmeier, et al.

The invention has been described with reference to a preferred embodiment; However, it will be appreciated that variations and modifications can be effected by a person of ordinary skill in the art without departing from the scope of the invention.

PARTS LIST 20 prior art circuit
22 transimpedence amplifiers
24 transimpedence amplifiers
26 transimpedence amplifiers
27 current mirror
28 transimpedence amplifiers
29 $V_{DRDW}$ signal output
30 preferred embodiment circuit
32 transimpedence preamplifier with output clamping
34 transimpedence preamplifier with output clamping
36 transimpedence preamplifier with output clamping
38 transimpedence preamplifier with output clamping
40 low input impedance transimpedence amplifier
42 summing node
43 PNP transistor
44 voltage clamp
46 summing node
48 voltage reference $V_{ref}$
49 focus photodetector element
50 DRDW signal conditioning amplifier
60 photodetector array

I claim:

1. An amplifier circuit for providing outputs as a function of sensed light comprising:

a photodetector element for providing a current output as a function of sensed light;

an amplifier having an input for receiving the current output from said photodetector element and for providing at an output an output signal that is a clamped function of sensed light;

feedback means connected between the input and the output of said amplifier;

clamping means connected to the output of said amplifier for clamping the output of said amplifier to a predetermined value;

a summing node having first, second, and third inputs, and an output at which a signal that is a function of sensed light is provided;

a first current path connected between the input to said amplifier and to a first input to said summing node for passing excess current from the input to said amplifier to the summing node when the output of said amplifier is at its clamped output;

a second current path connected between the output of said amplifier and a second input to summing node; and a reference voltage source connected to a third input to said summing node for limiting the current flowing through the second current path.

2. An amplifier circuit according to claim 1 wherein said amplifier is a transimpedence amplifier.

3. A plurality of amplifier circuits according to claim 1 and further comprising a second summing means having a number of inputs corresponding in number to the plurality of amplifier circuits with a each second summing means input connected to the output of a respective amplifier circuit summing means for providing a composite output signal indicative of the incident light sensed by the plurality of photodetector elements associated with the plurality of amplifier circuits.

4. An amplifier circuit for providing outputs as a function of sensed light comprising:

a photodetector element for providing a current output as a function of sensed light;

an amplifier having an input for receiving the current output from said photodetector element and for providing at an output an output signal that is a clamped function of sensed light;

feedback means connected between the input and the output of said amplifier;

clamping means connected to the output of said amplifier for clamping the output of said amplifier to a predetermined value;

a summing node having first, second, and third inputs, and an output at which a signal that is a function of sensed light is provided;

a first current path connected between the input to said amplifier and to a first input to said summing node for passing excess current from the input to said amplifier to the summing node when the output of said amplifier is at its clamped output;

a current means for providing a second current path to the second input of said summing node which senses a portion of the input current when said amplifier output is not clamped; and a reference voltage source connected to a third input to said summing node for limiting the current flowing through the second current path of said current means.

5. An amplifier circuit according to claim 4 wherein said amplifier is an operational amplifier of inverting or non-inverting polarity.

* * * * *